(12) United States Patent
Brown et al.

(10) Patent No.: US 8,452,013 B2
(45) Date of Patent: May 28, 2013

(54) SECURE MESSAGE HANDLING ON A MOBILE DEVICE

(75) Inventors: Michael S. Brown, Waterloo (CA); Michael K. Brown, Kitchener (CA)

(73) Assignee: Research In Motion Limited, Waterloo (CA)

( * ) Notice: Subject to any disclaimer, the term of this patent is extended or adjusted under 35 U.S.C. 154(b) by 1150 days.

(21) Appl. No.: 11/831,285

(22) Filed: Jul. 31, 2007

(65) Prior Publication Data

US 2009/0034729 A1 Feb. 5, 2009

(51) Int. Cl.
*H04L 9/32* (2006.01)
*H04K 1/00* (2006.01)

(52) U.S. Cl.
USPC .......................................... 380/270; 713/176

(58) Field of Classification Search
None
See application file for complete search history.

(56) References Cited

U.S. PATENT DOCUMENTS

| | | | |
|---|---|---|---|
| 5,764,899 A * | 6/1998 | Eggleston et al. ............ | 709/203 |
| 6,134,582 A * | 10/2000 | Kennedy ...................... | 709/206 |
| 2004/0090457 A1* | 5/2004 | Serdy et al. .................. | 345/752 |
| 2004/0205330 A1 | 10/2004 | Godfrey et al. | |
| 2006/0031299 A1* | 2/2006 | Robertson .................... | 709/206 |
| 2006/0085509 A1* | 4/2006 | Wener .......................... | 709/206 |

FOREIGN PATENT DOCUMENTS

| | | |
|---|---|---|
| CA | 2493802 A1 | 2/2004 |
| EP | 1420554 A | 5/2004 |
| GB | 2381998 A | 5/2003 |

OTHER PUBLICATIONS

Murphy, Galvin S. et al. "Security Multiparts for MIME: Multipart/Signed and Multipart/Encrypted; rfc1847.txt". Oct. 1995, IETF Standard, Internet Engineering Task Force, IETF, CH, XP015007632. ISSN:0000-0003.
Examination Report dated Feb. 1, 2011 from CA2595345.
Examination Report dated Apr. 12, 2012 from CA2595345.

* cited by examiner

*Primary Examiner* — Philip Chea
*Assistant Examiner* — Fatoumata Traore
(74) *Attorney, Agent, or Firm* — Jenna L. Wilson; Dimock Stratton LLP

(57) ABSTRACT

Systems, methods, and software for providing digital security to a child message transmitted from a mobile device to a messaging server, where the mobile device typically does not transmit the parent message with the child message to the messaging server. Whether to apply digital security, such as encryption or a digital signature, or both, is determined, and if the mobile device does not include a complete copy of a parent message for insertion into the child message, the mobile device selectively downloads the parent message from the messaging server prior to the computation of a digital signature or prior to encryption. The systems and methods may also provide a check of the child message size, when the child message includes inserted parent content, to ensure that the child message does not exceed any prescribed limits on message size.

36 Claims, 5 Drawing Sheets

SECURE MESSAGE HANDLING ON A MOBILE DEVICE

BACKGROUND

1. Technical Field

The present invention relates generally to mobile devices, and in particular to systems, methods, and software for handling secure messaging on a wireless communication device.

2. Description of the Related Art

Electronic messages, such as e-mail messages, are typically transmitted from sender to recipient devices in the clear and without verification. It is possible to provide a measure of digital security by either encrypting a message, or by attaching a digital signature to the message, or both. For example, the S/MIME (Secure Multipurpose Internet Mail Extensions) specification, RFC 1847 and associated specifications, published by the Internet Engineering Task Force, provide specifications for the secure transmission of MIME-encoded e-mail. However, if the body part of a message is modified after signature, then a recipient will not be able to validate the signature. Further, once a message is to be delivered in encrypted form, its content cannot be altered without decrypting and re-encrypting the message. Alteration of a digitally signed or encrypted message, then, compromises the security of the message.

When a wireless device is used to send and receive messages, it is sometimes desirable to introduce efficiencies into the wireless messaging process to reduce bandwidth and costs. For example, when a new message is sent from a mobile device in reply to a received message, or when a new message is sent from a mobile device forwarding a previously received message, the mobile device and its associated messaging server may operate such that the mobile device only transmits the new content of the new message to the messaging server, and the messaging server then appends the previously received message, which itself is stored at or in association with the messaging server, before causing the complete message to be transmitted to the ultimate recipient.

There has been hitherto an unrecognized need to balance the efficiencies of against the need for security protection. It is therefore desirable to provide an improved system and method for encrypted message handling with a mobile device.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

Figure 1:
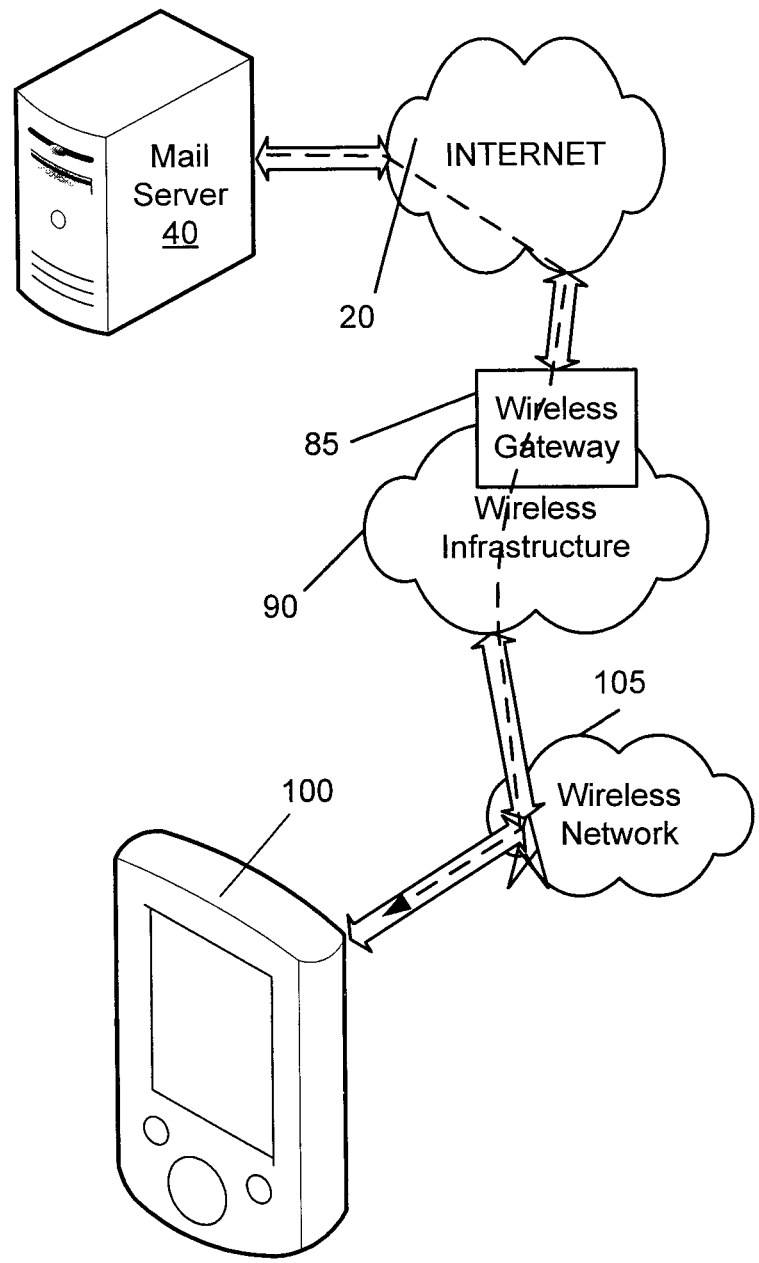
FIG. 1 is a schematic diagram of an exemplary network topology, including a mail server and a mobile device.

Referring to FIG. 1, an overview of an exemplary system for use with the embodiments described below is shown. One skilled in the art will appreciate that there may be many different topologies, but the system shown in FIG. 1 helps demonstrate the operation of the systems and methods described in the present application. For example, there may be many mobile devices connected to the system that are not shown in the simple overview of FIG. 1.

FIG. 1 shows a mobile device 100, which may comprise a mobile communication device. It will be appreciated by those skilled in the art that the mobile device may comprise any computing or communication device that is capable of connecting to a network by wireless means, including, but not limited, to personal computers (including tablet and laptop computers), personal digital assistants, smartphones, and the like. It will further be appreciated by those skilled in the art that these devices may be referred to herein as computing devices or communication devices, and may have principal functions directed to data or voice communication over a network, data storage or data processing, or the operation of personal or productivity applications; those skilled in the art will appreciate that terminology such as "mobile device", "mobile communications device", "communication device", "computing device", or "mobile device" may be used interchangeably.

The mobile device 100 may, for example, be connected to an Internet Service Provider on which a user of the system of FIG. 1, likely the user associated with the mobile device 100 illustrated in FIG. 1, has an account. The system of FIG. 1 may be located within a company, possibly connected to a local area network, and connected to the Internet or to another wide area network, or connected to the Internet or other network through a large application service provider. Reference to the Internet is provided as an example of a wide area network with which the embodiments described below may be implemented, and is not meant to be limiting to the size or public accessibility of the network with which the embodiments below may be implemented. Other features for network connectivity, such as the infrastructure of the local area network, Internet, wide area network, wireless gateway, and the like, are not shown in FIG. 1 but are known to those having ordinary skill in the art. The mobile device 100 may be capable of sending and receiving messages and other data via wireless transmission, typically at a radio frequency (RF), from a base station in a wireless network to the mobile device. The particular network may be any wireless network over which messages may be exchanged with a mobile device such as the mobile device 100. The mobile device may receive data by other means, for example through a direct connection to a port provided on the mobile device such as a Universal Serial Bus (USB) link. The mobile device may further be capable of wireless communication with other devices, not shown. For example, communication may take place over a wireless communication link operating in compliance with a standard such as Institute of Electrical and Electronic Engineers (IEEE) for Wireless LAN MAC and Physical layer (PHY) 802.11a, b, g and n specifications or future related standards, the Bluetooth® standard, the Zigbee™ standard and the like.

The mobile device 100 may be provided with a messaging application, such as an e-mail client, or a similar messaging application that is operable by a user of the device 100 to receive, view, transmit, reply to, and forward messages such as, but not restricted to, e-mail messages. For ease of reference, the following description refers to e-mail messages, although it will be appreciated that the embodiments described herein may apply to other electronic messages utilizing different formats or protocols that may be encrypted, digitally signed, or both encrypted and signed.

A server system 40, such as an enterprise messaging server system, is provided in the exemplary network of FIG. 1. The server system 40 may be implemented on one or more networked computers within the firewall of a corporation, or on a computer within an ISP or ASP system or the like. The server system 40 may act as the application, network access, and/or file server for one or more communication devices, and may also provide messaging functions. The mobile communications device 100, if it is configured for receiving and possibly sending e-mail or other forms of data communication, may be associated with an account on the server system 40. If the server system 40 acts as a message server, the server system 40 may support either a so-called "pull" or "push" message access scheme, wherein the mobile communications device 100 must request that stored messages be forwarded by the message server to the mobile device 100 ("pull"), or the server system 40 may be provided with systems and methods for automatically redirecting messages addressed to the user of the mobile device 100 as they are received ("push"). Other software products and other components that are often used in conjunction with the functions of the server system 40 described herein will be known to those skilled in the art. It will be appreciated that communications between the server 40 and the mobile device 100 may pass through intermediary servers or proxies, not shown in FIG. 1, particularly if the communications are transmitted through a wide area network, or if the mobile device is registered on a wireless network with which it is not usually associated (e.g., if the mobile device 100 is roaming away from its home wireless network).

In one embodiment, the mobile device 100 is configured to employ security protocols for applying security measures to messages transmitted from the device 100. As one example, the mobile device 100 may be configured to send and receive e-mail, and may be configured to employ the S/MIME protocol or the PGP (Pretty Good Protection) system such as offered by the PGP Corporation of Menlo Park, Calif., or both, as well as symmetric or asymmetric cryptography processes known by those of skill in the art. In a simple example, e-mail messages sent from the mobile device 100 may be secured using an asymmetric algorithm. The message content may be encrypted, employing a public key associated with the recipient prior to transmission from the device 100. The public key may be found, for example, in a digital certificate associated with the recipient and stored on the mobile device 100, or in a key store accessible to the mobile device 100. The delivery of digital certificates for use in encrypting messages is understood by those skilled in the art. Upon receipt of an encrypted e-mail message, a recipient may use a private key corresponding to the public key used at the device 100 to decrypt the encrypted portion of the message.

Similarly, a message to be transmitted from the mobile device 100 to a recipient may be digitally signed. For example, a hash of the message content and the sender's private key may be used to produce a digital signature, which is attached to the message. The message and the attached digital signature are then transmitted from the device 100. Once the message is received by the recipient, the recipient may verify the attached digital signature using a public key corresponding to the sender's private key; the public key may be found in a digital certificate associated with the sender available to the recipient. The public key may be used to extract the hash value previously encoded with the sender's private key. If the hash value thus obtained matches an independently computed hash of the message content as received by the recipient, then the digital signature is verified, and to the extent that the digital certificate may be relied upon as validly representing the sender of the digitally signed message. Thus, if the message content is somehow altered after signing but before receipt by the recipient, the digital signature may not be verified. It will also be appreciated that electronic messages may further be both encrypted and digitally signed. While the process of digitally signing messages and verifying digital signatures, and encrypting and decrypting messages, will be well understood by those skilled in the art, the process is summarized here to illustrate that the correct verification of a digital signature and the successful encryption and decryption of a message are dependent on the receipt of accurate message content, or may prohibit alterations to the message content.

At the same time, it will be appreciated that in some embodiments, the messaging application on the mobile device 100 and the message server 40 may be configured to provide efficiencies in the messaging process. For example, when a parent message is received at the message server system 40 addressed to a user of the mobile device 100, when the message is then "pushed" to or "pulled" by the mobile device 100 only a portion of the message may be initially received by the device 100. For example, the device 100 may initially receive only the header or select information from the header, and perhaps other metadata. The header of a message typically contains information such as the sender's address, a timestamp, and a subject line. Other metadata may include information such as the size of the message content, the total size of the message content and header, the size of attachments to the message, or information regarding digital signature or encryption of the message. The mobile device 100 may initially receive the header or select information from the header and optionally other metadata, and may further receive at least a first chunk of the message, for example only the first 10 kilobytes of the message content. Further chunks or portions of the message, or attachments to the message, may be subsequently downloaded either upon user request or automatically.

A further efficiency may be realized when the mobile device 100 is used to compose and transmit a message that comprises a reply to a message previously received at the device 100, or that forwards a message previously received at the device 100. For ease of reference, the message previously received by the device 100 will be referred to herein as a "parent" message. A further message that is composed in reply to a parent message, or that forwards a parent message, may be termed a "child" message. It will be appreciated that the child message may or may not incorporate portions of the parent message either as an attachment, or within the body or content of the child message itself (i.e., not as an attachment). Users may prefer to incorporate the parent message inline because it provides immediate context to the new content of the child message; for example, reply messages may reference information contained in the body of the parent message without repeating it, so repeating the content of the parent message in the body of the child message provides content that may be useful for a reader of the child message.

If a child message is composed at the mobile device 100, the messaging application may be configured to display a message composition user interface that purports to append the parent message (for example, select information from the message header as well as the message content) to the child message. However, when the child message is actually sent from the mobile device 100 to the message server 40, which in turn redirects the child message to the appropriate recipient(s), the mobile device 100 may not in fact transmit the parent message at all; rather, the server 40 may be configured to identify the parent message (for example, from a command associated with the child message transmitted by the mobile device 100) and to append the parent message to the child message at the server 40, prior to redirecting the child message to the appropriate recipient(s). This provides an efficiency in bandwidth consumption, since the mobile device 100 need not transmit the extra data comprising the parent message. This presumes, of course, that the server 40 maintains access to a copy of the parent message; otherwise, the parent message may not be appended, or the server 40 may request a copy of the parent message from the mobile device 100.

Thus, it can be seen that a child message may be composed at and transmitted from the mobile device 100 without even requiring that the complete parent message be received at the mobile device 100, since, as noted above, messages destined for the mobile device 100 may be delivered only in chunks. Protocols for instituting such efficiencies are known in the art, for example the Internet Message Access Protocol (IMAP) "CATENATE" extension described in RFC 4469 as published by the Internet Engineering Task Force, and the Internet Email to Support Diverse Service Environments (LEMONADE) profile described in RFC 4550 as published by the Internet Engineering Task Force, both published by the Internet Engineering Task Force. However, such protocols do not address the need for security in messaging by providing for digital encryption or signature. As noted above, if the message content is altered after a digital signature is computed, the signature may not be capable of verification by the recipient; further, the server 40 may not alter the message content to append a parent message if the child message has been encrypted.

Figure 2:
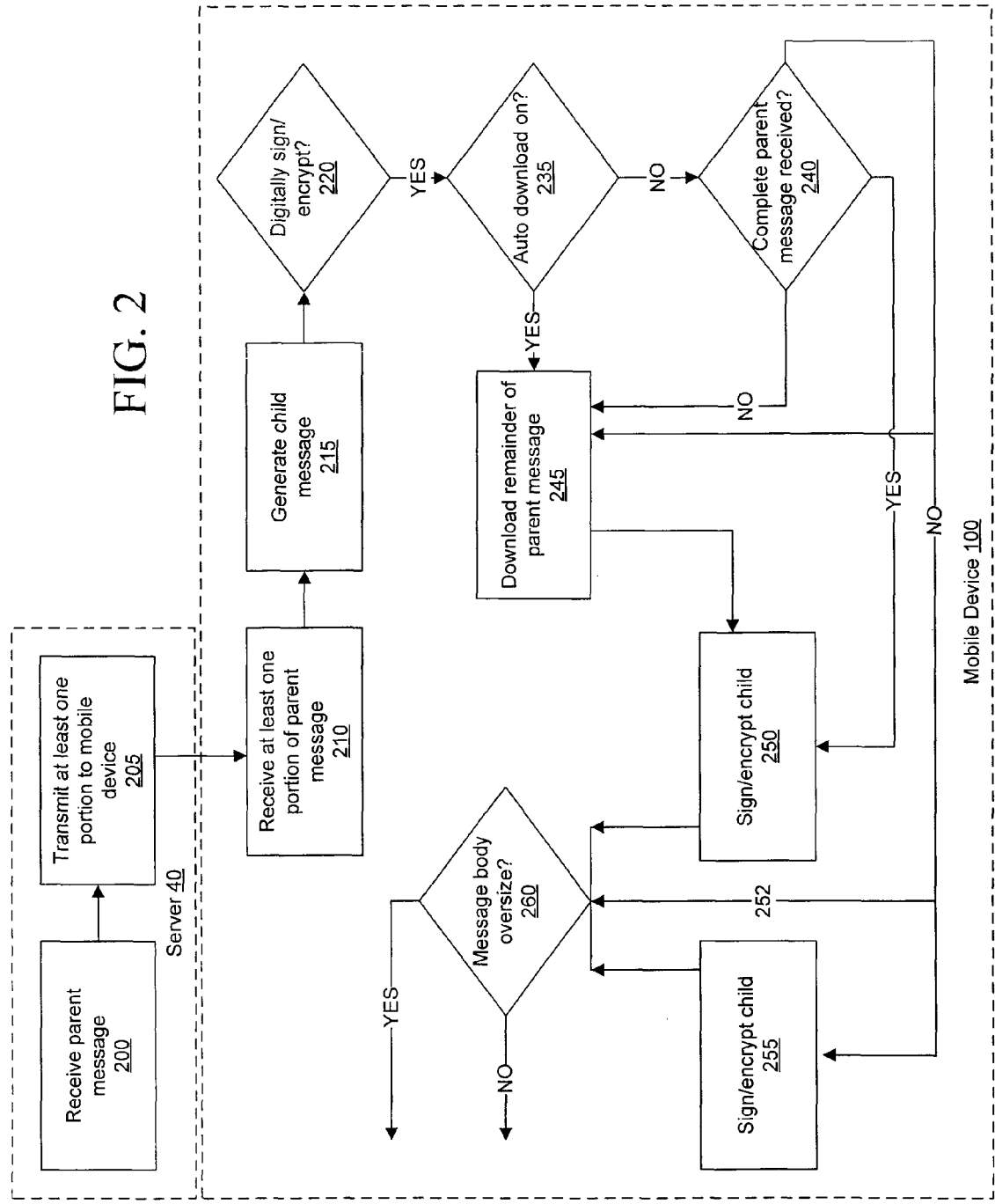
FIG. 2 is a flowchart of a method for handling secured messages to be transmitted from the mobile device.

Therefore, an embodiment is provided to handle the need for digital signatures and encryption in the face of wireless messaging efficiencies. With reference to FIG. 2, an exemplary method is provided. At the server 40, a parent message is received, for example as described above, at 200. At least a portion of this parent message is transmitted to the mobile device 100 at 205, and is received by the mobile device 100 at 210. At 215, a child message is generated; this may take place by processes that are known in the art, for example via the operation of a messaging application on the mobile device 100. At 220, there is provided a decision block regarding whether the child message is to be digitally signed or encrypted, or both signed and encrypted. This may be determined by a flag or other setting at the mobile device 100; for example, the mobile device 100 or the messaging application may be configured to automatically sign, encrypt, or sign and encrypt each message transmitted from the device 100. Alternatively, the mobile device 100 or messaging application may be configured to automatically sign, encrypt, or sign and encrypt each message matching a predefined criteria, for example messages addressed to a predefined recipient or messages containing predefined strings within the message body. If the determination to sign, encrypt, or digitally sign and encrypt a message is to be made by a user, user input regarding signatures and encryption may be solicited by the messaging application either after the child message has been generated 215, as shown in FIG. 2, or prior to the generation of the child message at 215.

Figure 4C:
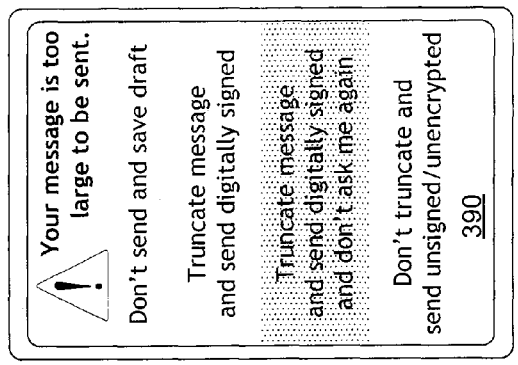
FIGS. 4a, 4b, and 4c are exemplary user interfaces implemented on the mobile device.
Figure 4A:
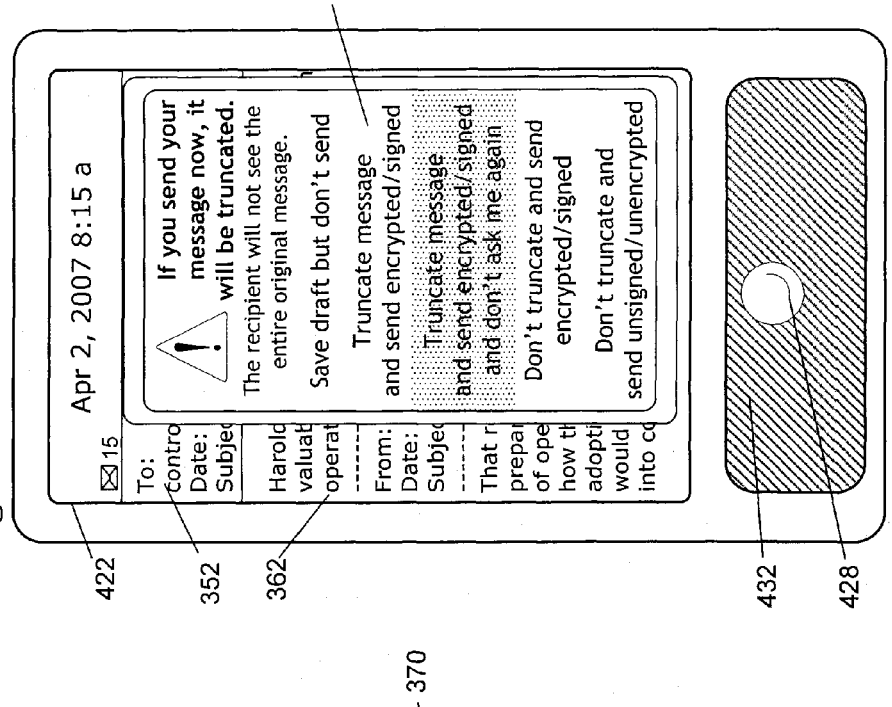

For example, when a parent message or a portion thereof is received at 210, the user may be presented with options to reply to or forward the parent message, as shown in FIG. 4*a*. FIG. 4*a* illustrates an exemplary user interface for display on a mobile device 100's display 422. A user keyboard or similar input device is represented by block 432; the mobile device 100 may also comprise another input device such as a trackball 428. In other embodiments, the display 422 may comprise a touchscreen which is capable of receiving user input without the use of a keyboard 432 or other input device 428.

The user interface in this embodiment comprises a display of received parent message header data 350 and the message content 360. The user interface further comprises a context menu 370, which provides the user of the mobile device 100 with options regarding replying and forwarding the message; as can be seen in FIG. 4*a*, the first three options at the top of the context menu 370 provide options for "reply" (e.g., reply to the sender of the parent message), "reply all" (e.g., reply to the sender and all recipients of the parent message), and "forward" (e.g., forward the message to one or more recipients to be designated by the user) without signing or encrypting the child message. The second three options in the menu 370, under the heading "Signed", are similar to the first three; however, if one of these options is selected, the messaging application is instructed that the child message is to be digitally signed before transmission. Similar options are provided for "Encrypted" child messages, and for signed and encrypted child messages ("Sign&Encrypt"). If such a selection is made prior to the generation of the child message at 215, then a flag or other data may be set to instruct the messaging application to subsequently compute a digital signature, or encrypt the child message, once it is indicated that composition of the child message is complete (for example, by the user invoking a "send" command).

Once the child message has been generated and it has been determined that the child message is to be digitally signed and encrypted, regardless of the order of such act and determination, in one embodiment the messaging application then determines whether the messaging application has already received the complete parent message corresponding to the child message at 235. If the complete parent message has already been received and stored at the mobile device 100 as indicated at 240, then the messaging application may insert the content of the parent message, or both the content and at least a portion of the header information, into the child message prior to signing, encrypting, or both signing and encrypting the child message at 250. Thus, when the digital signature is computed, the signature will be computed based on not only the newer content of the child message, but also on the repeated content of the parent message inserted therein; and when the message is encrypted, the encrypted content will include the inserted content of the parent message.

Figure 4B:
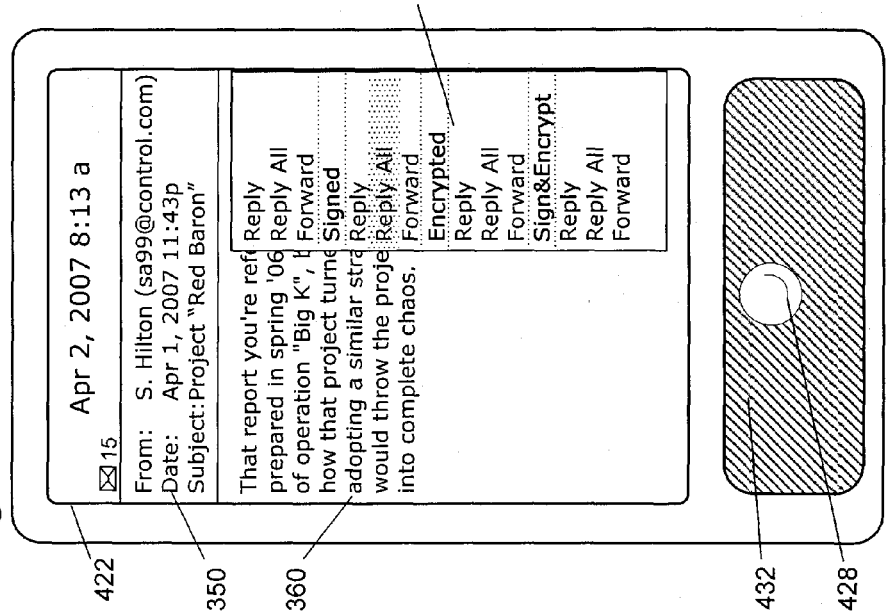

If only a portion of the parent message has been received and stored by the mobile device 100, then digital security may be applied to the child message either on the basis of the parent message portion that is available at that time, or after a complete copy of the parent message has been downloaded to the mobile device 100. In one embodiment, the choice between these two options may be executed manually by the user of the device 100. FIG. 4*b* depicts an exemplary user interface that may be presented to a user attempting to send a message with digital security when a complete parent message is not available at the mobile device 100, when the messaging application is configured to normally transmit only the child content of a message to the server 40, such that the server 40 may append the parent message prior to redirection. In this example of a user interface, a context menu 380 overlays a background in which the generated child message 362 and header 352 are displayed. While the display 422 as shown does repeat the content and header of the parent message, this is shown in the display 422 for the user's convenience only; as explained above, an efficiency in wireless messaging provides that the parent message is appended only at the server 40. The context menu 380 warns the user that if the message is sent as is (that is, signed or encrypted, or both), it will be truncated, without the original message, or with only a portion of the original message; thus, the recipient will not see the original message, and will possibly lack useful context that may be gained by providing the recipient with a copy of the parent message. The context menu 380 provides the user with at least two options, which may be selected from the option of not sending the message and optionally saving the child message in draft form, so that the user may further consider what action to take; allowing the message to be transmitted as is, that is to say, signing, encrypting, or signing and encrypting, the message in its truncated form excluding the parent message, as indicated at 255 in FIG. 2; allowing the message to be transmitted as is as at 255 in FIG. 2, but further setting a flag making transmission "as is" the default instruction in the messaging application, so that the user is no longer presented with the context menu 380; downloading the complete copy of the parent message, then signing, encrypting, or signing and encrypting the message comprising both the child content and the inserted parent message, as indicated at 245 and 250 of FIG. 2; or, finally, sending the message in plaintext without a signature and not truncated as indicated by the arrow 252 in FIG. 2. In this latter option, the child message is handled like a typical child message sent in plaintext; upon receipt by the server 40, the corresponding parent message is appended to the child message prior to redirection to the recipient(s).

In a further embodiment, the messaging application may be configured to automatically download the parent message if only a portion of the parent message is currently stored at the mobile device 100, as indicated in FIG. 2 at 235. For example, the messaging application may be configured to check a flag or other instructional data stored at the mobile device 100, which indicates whether an "auto download" instruction has been invoked. If an auto download instruction has been invoked, then the mobile device 100 may automatically download a complete copy of a parent message without requesting user input in advance, upon determination that the messaging application has been instructed to transmit a child message that is to be either signed, encrypted, or signed and encrypted and that a complete copy of the parent message is not currently stored at the mobile device 100. This automatic download process, indicated at 245, may commence after it is determined that the child message has been generated, for example by the user's invocation of a "send" command. In another embodiment, the automatic download process 245 may commence as soon as a user has indicated that he or she wishes to generate a child message that will be signed, encrypted, or signed and encrypted, for example at approximately the same time as the initiation of the generation process at 215. By initiating any required automated download at this earlier stage, the user may experience improved performance of the mobile device 100, because the user will not have to wait at a later stage for the parent message to be downloaded.

It will be appreciated that, from time to time, the mobile device 100 may not be able to download a complete copy of the parent message when it is required; for example, the message server system 40 may not be available, or the mobile device 100 may have been moved out of the coverage area of the wireless network 105. The messaging application may be further configured in those cases to provide a context menu to the user similar to the menu 380 shown in FIG. 4b, without the "don't truncate" (i.e., downloading the parent message) options.

Once any required digital signature or encryption processes have been completed, in a further embodiment, the child message body size may be checked prior to transmission from the mobile device 100. In some mobile devices or wireless networks, limits may be imposed on the size of messages transmitted from the mobile device; for example, a limit of 64 kilobytes may be imposed on the total size of a message, excluding any attachments, wherein 32 kilobytes of the message may be allocated to the message header. Such limitations may be imposed in order to minimize bandwidth consumption and costs, and may of course vary from device to device or network to network. In some embodiments, there may or may not be a limit on the size of attachments associated with messages transmitted from the mobile device.

Figure 3:
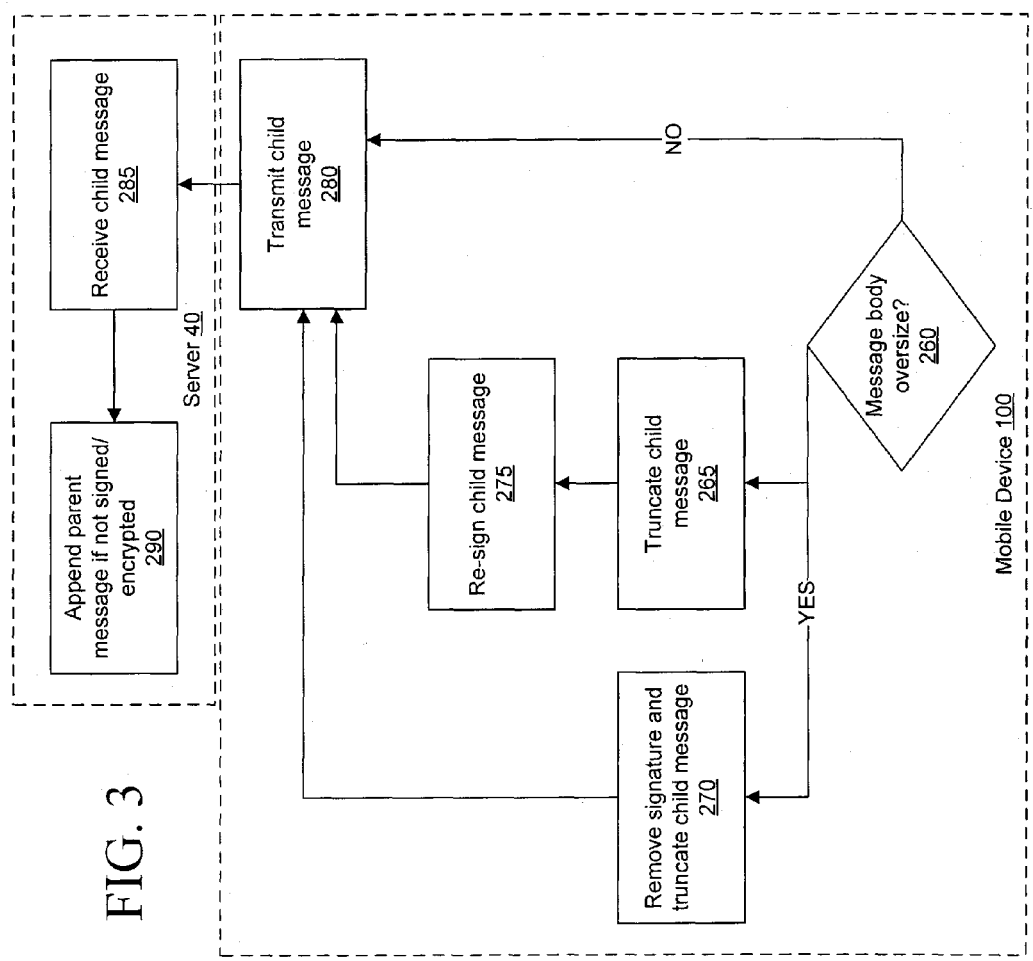
FIG. 3 is a flowchart of a method for handling oversized secured messages to be transmitted from the mobile device.

When a parent message is downloaded to the mobile device 100 and inserted into a child message for transmission from the mobile device 100, the complete child message size may exceed the prescribed limits. Thus, in this further embodiment, the message body size is checked, as indicated at 260 in FIG. 2, and in FIG. 3. With reference to FIG. 3, if the message body is not oversized, then the mobile device 100 may proceed to transmit the child message, as indicated at 280. If the message body is oversized, then the messaging application or mobile device 100 may be configured to present a further warning or menu to the user in the device's display 422. An example of such a warning or menu 390 is provided in FIG. 4c. The warning may include one or more options, which may be selected from the option of not sending the message and optionally saving the child message in draft form, so that the user may further consider what action to take; allowing the message to be truncated to a size that will comply with the prescribed limitations, while still requiring that the message be digitally signed, as indicated at 265 in FIG. 3; allowing the message to be truncated as indicated at 265 in FIG. 3, but further setting a flag making this the default instruction, so that the user is no longer presented with the context menu 390 in future; or, choosing to send the message unsigned but not truncated, as indicated at 270 in FIG. 3. In this latter option, the child message is handled like a typical child message sent in plaintext when it is transmitted at 280; upon receipt by the server 40 as indicated at 285, the corresponding parent message is appended to the child message prior to redirection to the recipient(s) at 290. The addition of the parent message at the server 40 rather than at the mobile device 100 will not impact the validity of any digital signature, since the message is no longer being sent with a digital signature.

If the user chooses to have the child message truncated, as indicated at 265 in FIG. 3, then the message content is truncated (for example, some or all of the parent message that had been included may be deleted), and the digital signature recomputed on the basis of this truncated child message, as indicated at 275, prior to transmission at 280. When a child message that is signed or encrypted, or both, is received at the server 40 from the mobile device 100, the server 40 will not attempt to append any further message content to the child message prior to redirection.

The foregoing handling of oversize messages may be applicable to encrypted content if the content, once encrypted, is incorporated into the body of the child message. However, it will be appreciated that if the encrypted content is instead appended as an attachment to the child message, then the size limitations applied to the body of messages sent from the mobile device 100 may not apply.

It will also be appreciated that in some embodiments, when the child message is truncated either by deleting a portion of the inserted parent message, or by not including the parent message at all, an indicator may be automatically inserted by the messaging application at the end of the message content to indicate this. For example, the messaging application may insert the phrase "MESSAGE TRUNCATED" or "ORIGINAL MESSAGE DELETED", so that the recipient will be made aware of the possible lack of information.

Thus, it can be seen that the above-described embodiments provide a system and method by which the user, who composes the child message at the mobile device 100, may be alerted to the fact that proceeding with message signature or encryption may result in the truncation of a child message. In this way, the user is provided the option of ensuring, before encryption or signature, that all relevant contexts are included in the body of the child message. By providing a system that also automatically downloads complete messages, optionally in the background during message composition, if it is determined that a message is to be digitally signed or encrypted, the foregoing embodiments further provide a system and method that takes advantage of available wireless communication efficiencies where possible, while ensuring that secure messaging is still available to mobile device 100. The foregoing embodiments also provide a solution that does not require the server 40 to maintain a copy of the sender's private keys in order to digitally sign messages at the server 40 after they are assembled, thus reducing a security risk associated with the distribution of private keys and further reducing the risk that an intermediary between the server 40 and the mobile device 100 may intercept a message that is sent in the clear from the mobile device 100 to the server 40.

Figure 5:
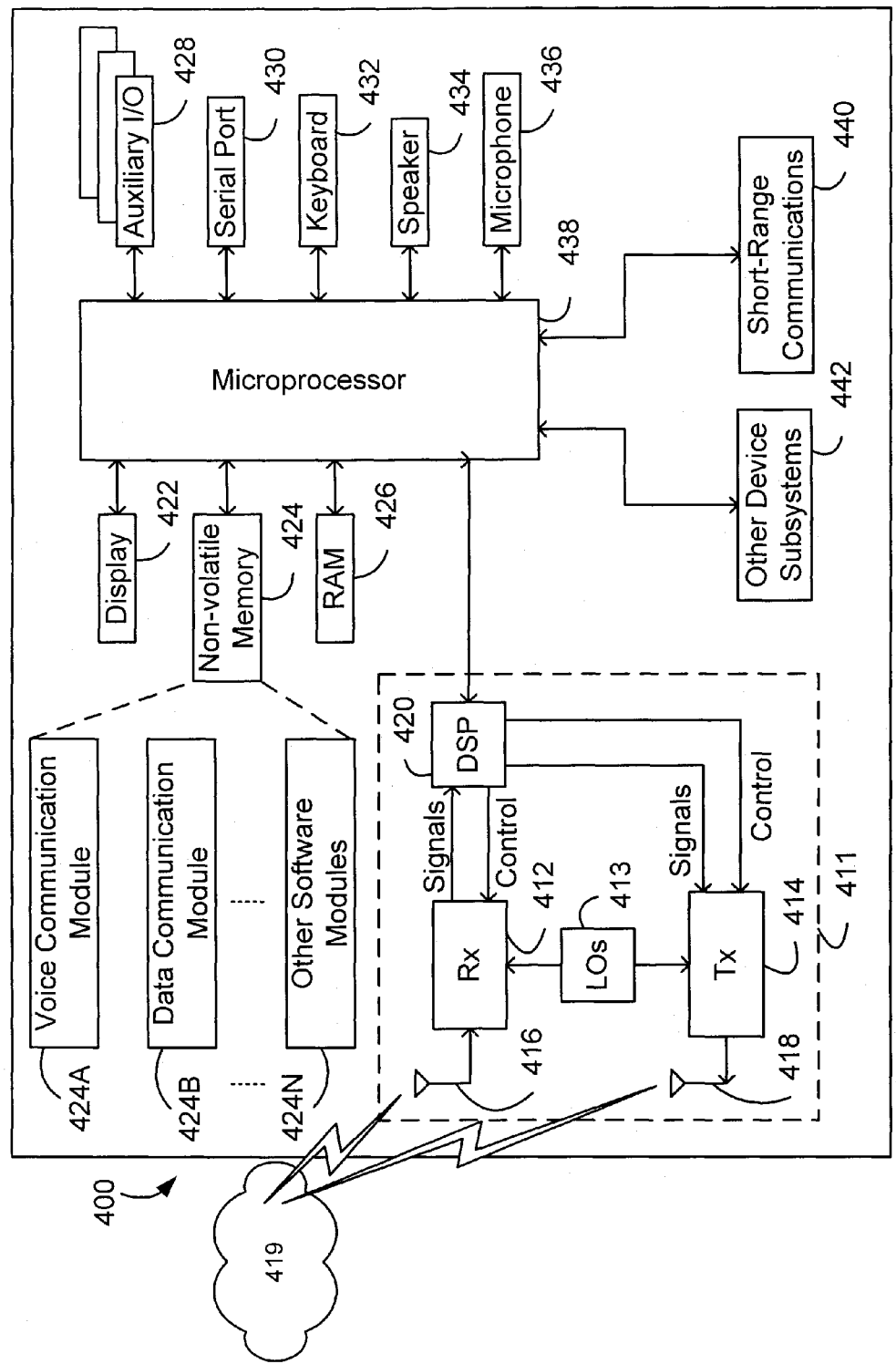
FIG. 5 is a further schematic diagram of an exemplary wireless mobile communications device.

As another example, the systems and methods disclosed herein may be used with many different computers and devices, such as a further wireless mobile device 400 shown in FIG. 5. With reference to FIG. 5, the mobile device 400 is a dual-mode mobile device and includes a transceiver 411, a microprocessor 438, a display 422, non-volatile memory 424, random access memory (RAM) 426, one or more auxiliary input/output (I/O) devices 428 including, but not limited to, a trackball or touchpad, a serial port 430, a keyboard 432, a speaker 434, a microphone 436, a short-range wireless communications sub-system 440, and other device sub-systems 442.

The mobile device 400 may be a two-way communication device having voice and data communication capabilities. Thus, for example, the mobile device 400 may communicate over a voice network, such as any of the analog or digital cellular networks, and may also communicate over a data network. These voice and data networks 419 may be separate communication networks using separate infrastructure, such as base stations, network controllers, etc., or they may be integrated into a single wireless network.

The transceiver 411 includes a receiver 412, a transmitter 414, antennas 416 and 418, one or more local oscillators 413, and a digital signal processor (DSP) 420. The antennas 416 and 418 may be antenna elements of a multiple-element antenna, and may be embedded antennas. However, the systems and methods described herein are in no way restricted to a particular type of antenna, or even to wireless communication devices. In one embodiment, the DSP 420 is used to send and receive signals to and from the antennas 416 and 418, and also provides control information to the receiver 412 and the transmitter 414. If the voice and data communications occur at a single frequency, or closely-spaced sets of frequencies, then a single local oscillator 413 may be used in conjunction with the receiver 412 and the transmitter 414. Alternatively, if different frequencies are utilized for voice communications versus data communications for example, then a plurality of local oscillators 413 can be used to generate a plurality of frequencies corresponding to the voice and data networks 419. Information, which includes both voice and data information, is communicated to and from the transceiver 411 via a link between the DSP 420 and the microprocessor 438.

The detailed design of the transceiver 411, such as frequency band, component selection, power level, etc., will be dependent upon the voice and data networks 419 in which the mobile device 400 is intended to operate. The voice and data networks 419 may be separate voice networks and separate data networks, or may comprise integrated voice and data networks. It will be appreciated by those skilled in the art that these embodiments may be implemented on a variety of voice and data networks 419, including, but not limited to, 2 G, 2.5 G, 3 G, 4 G, and other voice and data networks, such as GSM, CDMA2000, GPRS, EDGE, W-CDMA (UMTS), FOMA, EV-DO, TD-SCDMA, HSPA, HSOPA, and the like.

Depending upon the type of network or networks 419, the access requirements for the mobile device 400 may also vary. For example, in GPRS data networks, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the voice and data networks 419, other than any legally required operations, such as '911' emergency calling.

After any required network registration or activation procedures have been completed, the mobile device 400 may then send and receive communication signals, including both voice and data signals, over the voice and networks 419. Signals received by the antenna 416 from the voice and data networks 419 are routed to the receiver 412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the voice and data networks 419 are processed, including modulation and encoding, for example, by the DSP 420 and are then provided to the transmitter 414 for digital to analog conversion, frequency up conversion, filtering, amplification and transmission to the voice and data networks 419 via the antenna 418.

In addition to processing the communication signals, the DSP 420 also provides for transceiver control. For example, the gain levels applied to communication signals in the receiver 412 and the transmitter 414 may be adaptively controlled through automatic gain control algorithms implemented in the DSP 420. Other transceiver control algorithms could also be implemented in the DSP 420 in order to provide more sophisticated control of the transceiver 411.

The microprocessor 438 manages and controls the overall operation of the mobile device 100. Many types of microprocessors or microcontrollers could be used here, or, alternatively, a single DSP 420 could be used to carry out the functions of the microprocessor 438. Low-level communication functions, including at least data and voice communications, are performed through the DSP 420 in the transceiver 411. Other, high-level communication applications, such as a voice communication application 424A, and a data communication application 424B may be stored in the non-volatile memory 424 for execution by the microprocessor 438. For example, the voice communication module 424A may provide a high-level user interface operable to transmit and receive voice calls between the mobile device 400 and a plurality of other voice or dual-mode devices via the voice and data networks 419. Similarly, the data communication module 424B may provide a high-level user interface operable for sending and receiving data, such as e-mail messages, files, organizer information, short text messages, etc., between the mobile device 100 and a plurality of other data devices via the voice and data networks 419. The microprocessor 438 also interacts with other device subsystems, such as the display 422, the RAM 426, the auxiliary input/output (I/O) subsystems 428, the serial port 430, the keyboard 432, the speaker 434, the microphone 436, the short-range communications subsystem 440 and any other device subsystems generally designated as 442.

Some of the subsystems shown in FIG. 5 perform communication-related functions, whereas other subsystems may provide "resident" or on-device functions. Notably, some subsystems, such as the keyboard 432 and the display 422 may be used for both communication-related functions, such as entering a text message for transmission over a data communication network, and device-resident functions such as a calculator or task list or other PDA type functions.

Operating system software used by the microprocessor 438 may be stored in a persistent store such as non-volatile memory 424. The non-volatile memory 424 may be implemented, for example, as a Flash memory component, or as battery backed-up RAM. In addition to the operating system, which controls low-level functions of the mobile device 410, the non-volatile memory 424 includes a plurality of software modules 424A-424N that can be executed by the microprocessor 438 (and/or the DSP 420), including a voice communication module 424A, a data communication module 424B, and a plurality of other operational modules 424N for carrying out a plurality of other functions. These modules are executed by the microprocessor 438 and provide a high-level interface between a user and the mobile device 100. This interface typically includes a graphical component provided through the display 422, and an input/output component provided through the auxiliary I/O 428, keyboard 432, speaker 434, and microphone 436. The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in a persistent store such as the Flash memory 424.

The non-volatile memory 424 may provide a file system to facilitate storage of PIM (Personal Information Manager) data items on the device. The PIM application may include the ability to send and receive data items, either by itself, or in conjunction with the voice and data communication modules 424A, 424B, via the voice and data networks 419. The PIM data items may be seamlessly integrated, synchronized and updated, via the voice and data networks 419, with a corresponding set of data items stored or associated with a host computer system, thereby creating a mirrored system for data items associated with a particular user.

Context objects representing at least partially decoded data items, as well as fully decoded data items, may be stored on the mobile device 400 in a volatile and non-persistent store such as the RAM 426. Such information may instead be stored in the non-volatile memory 424, for example, when storage intervals are relatively short, such that the information is removed from memory soon after it is stored. However, in one embodiment, this information is stored in the RAM 426 or another volatile and non-persistent store to ensure that the information is erased from memory when the mobile device 400 loses power. This prevents an unauthorized party from obtaining any stored decoded or partially decoded information by removing a memory chip from the mobile device 100, for example.

The mobile device 400 may be manually synchronized with a host system by placing the device 400 in an interface cradle, which couples the serial port 430 of the mobile device 400 to the serial port of a computer system or device. The serial port 430 may also be used to enable a user to set preferences through an external device or software application, or to download other application modules 424N for installation. This wired download path may be used to load an encryption key onto the device, which is a more secure method than exchanging encryption information via the wireless network 419.

A short-range communications subsystem 440 may also be included in the mobile device 400. The subsystem 440 may include an infrared device and associated circuits and components, or a short-range RF communication module such as a Bluetooth® module or an 802.11 module, for example, to provide for communication with similarly-enabled systems and devices.

The systems and methods disclosed herein are presented only by way of example and are not meant to limit the scope of the invention. Various embodiments of the present invention having been thus described in detail by way of example, other variations of the systems and methods described above will be apparent to those skilled in the art and as such are considered to be within the scope of the invention. The invention includes all such variations and modifications as fall within the scope of the appended claims. For example, it should be understood that acts, steps and the order of the steps or acts in the processing described herein may be altered, modified or augmented, or that said steps may be carried out by software or hardware modules, or combined software and hardware modules designed for such purpose, and still achieve the desired outcome.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A method implemented at a mobile device for providing digital security to a message transmitted from a mobile device, the method comprising:

initiating the generation of a message to be transmitted, the message to be transmitted being associated with a previously received message, only a portion of the previously received message being stored at the mobile device;

determining that digital security comprising one or more of encryption and a digital signature is to be applied to the message to be transmitted from the mobile device;

after initiating the generation of the message to be transmitted and determining that digital security is to be applied to the message to be transmitted, the mobile device obtaining a complete copy of the previously received message by downloading the complete copy while the message to be transmitted is being generated;

appending the previously received message thus obtained to the message to be transmitted;

applying the digital security to the message to be transmitted comprising the appended previously received message; and transmitting the message to be transmitted from the mobile device.

2. The method of claim 1, wherein the digital security comprises the digital signature.

3. The method of claim 1, wherein the digital security comprises encryption.

4. The method of claim 1, wherein the message to be transmitted comprises a reply to the previously received message.

5. The method of claim 1, wherein the message to be transmitted comprises a message that forwards the previously received message to one or more recipients.

6. The method of claim 1, wherein the portion of said previously received message comprises a first initially received chunk of the previously received message.

7. The method of claim 6, wherein the first initially received chunk comprises a header of the previously received message.

8. The method of claim 1, wherein generating the message to be transmitted comprises composition of the message at the mobile device.

9. The method of claim 1, wherein the digital security complies with the S/MIME standard.

10. The method of claim 1, wherein the digital security complies with a PGP standard.

11. The method of claim 1, further comprising requesting an instruction to obtain the complete copy of the previously received message and, in response to said instruction, applying digital security to the message to be transmitted after appending said previously received message to the message to be transmitted.

12. The method of claim 1, further comprising:
determining whether a body of the message to be transmitted exceeds a predetermined size limit; and
selectively truncating the body of the message to be transmitted prior to transmission of said message, if the body of said message exceeds said size limit,
wherein the message to be transmitted is associated with a digital signature.

13. The method of claim 12, wherein determining whether the body of the message exceeds the predetermined size limit and selectively truncating the body of the message prior to transmission of the message comprises requesting an instruction relating to truncation of the message and, in response to said instruction, disassociating the digital signature from the message and truncating the message.

14. The method of claim 13, wherein requesting the instruction relating to truncation of the message further comprises:
recomputing a digital signature for the truncated message; and
associating the recomputed digital signature with the truncated message.

15. The method of claim 1, wherein initiating the generation of the message to be transmitted comprises receiving input at the mobile device to generate a new message.

16. The method of claim 1, wherein the generation of the message to be transmitted comprises receiving input for adding content to the message to be transmitted.

17. The method of claim 1, wherein obtaining a complete copy of the previously received message comprises receiving an entirety of a body of the previously received message.

18. A mobile device for providing digital security to a message comprising a processor configured to:
initiate the generation of a message to be transmitted, the message to be transmitted being associated with a previously received message, only a portion of the previously received message being stored at the mobile device;
determine that digital security comprising one or more of encryption and a digital signature is to be applied to the message to be transmitted from the mobile device;
after initiating the generation of the message to be transmitted and determining that digital security is to be applied to the message to be transmitted, obtain a complete copy of the previously received message by downloading while the message to be transmitted is being generated;
append the previously received message thus obtained to the message to be transmitted;
apply the digital security to the message to be transmitted comprising the appended previously received message; and
transmit the message to be transmitted.

19. The mobile device of claim 18, wherein the mobile device comprises a smartphone.

20. The mobile device of claim 18, wherein the mobile device comprises a personal computer.

21. The mobile device of claim 18, wherein the message to be transmitted comprises a reply to the previously received message.

22. The mobile device of claim 18, wherein the message to be transmitted comprises a message that forwards the previously received message to one or more recipients.

23. The mobile device of claim 18, wherein the said portion of said previously received message comprises a first initially received chunk of said previously received message.

24. The mobile device of claim 18, wherein the first initially received chunk comprises a header of the previously received message.

25. The mobile device of claim 18, wherein the digital security complies with either the S/MIME standard or the PGP standard.

26. The mobile device of claim 18, wherein the processor is further configured to:
determine whether a body of the message to be transmitted exceeds a predetermined size limit, and to selectively truncate the body of the message prior to transmission of the message, if said body of the message exceeds said size limit,
wherein the message is associated with a digital signature.

27. The mobile device of claim 26, wherein the processor is further configured to request an instruction relating to truncation of the body of the message and, in response to said instruction, disassociate the digital signature from the message to be transmitted and truncate the message to be transmitted.

28. The mobile device of claim 27, wherein the processor is further configured to:
recompute a digital signature for the truncated message; and
associate the recomputed digital signature with the truncated message.

29. The mobile device of claim 18, wherein the mobile device is LEMONADE compliant.

30. The mobile device of claim 18, wherein obtaining a complete copy of the message comprises receiving an entirety of a body of the previously received message.

31. The mobile device of claim 18, wherein initiating the generation of the message to be transmitted comprises receiving input at the mobile device to generate a new message.

32. The mobile device of claim 18, wherein the generation of the message to be transmitted comprises receiving input for adding content to the message to be transmitted.

33. A non-transitory computer-readable medium comprising code executable by a computing device for causing the computing device to:
initiate the generation of a message to be transmitted, the message to be transmitted being associated with a previously received message, only a portion of the previously received message being stored at the mobile device;
determine that digital security comprising one or more of encryption and a digital signature is to be applied to the message to be transmitted from the mobile device;
after initiating the generation of the message to be transmitted and determining that digital security is to be applied to the message to be transmitted, obtain a complete copy of the previously received message by downloading the complete copy while the message to be transmitted is being generated;
append the previously received message into the message to be transmitted;
apply the digital security to the message to be transmitted comprising the appended previously received message; and
transmit the message to be transmitted.

34. A method implemented at a mobile device for providing digital security to a message transmitted from a mobile device, the method comprising:
initiating the generation of a message to be transmitted associated with a previously received message, only a portion of the previously received message being stored at the mobile device;
determining that a digital signature is to be applied to the message to be transmitted;
obtaining a complete copy of the previously received message by download after the determining and while the message to be transmitted is being generated;
inserting content from the complete copy of the previously received message into the message;
determining whether a body of the message to be transmitted comprising the inserted content exceeds a predetermined size limit, and truncating the body prior to transmission of the message if the body exceeds the size limit;
applying the digital signature to the truncated message; and
transmitting the message.

35. The method of claim 34, further comprising:
after inserting the content but before determining whether the body of the message to be transmitted comprising the inserted content exceeds the predetermined size limit, applying an initial digital signature to the message to be transmitted comprising the inserted content,
the digital signature applied to the truncated message thus being recomputed after the truncating.

36. A method implemented at a mobile device for providing digital security to a message transmitted from a mobile device, the method comprising:
initiating the generation of a message to be transmitted, the message to be transmitted being associated with a previously received message, only a portion of the previously received message being stored at the mobile device;
determining that encryption is to be applied to the message to be transmitted from the mobile device;
obtaining a complete copy of the previously received message by download while the message to be transmitted is being generated;
appending the previously received message to the message to be transmitted;
encrypting the message to be transmitted comprising the appended previously received message; and
transmitting the message.

* * * * *